(12) United States Patent
Sasaki et al.

(10) Patent No.: US 6,721,108 B2
(45) Date of Patent: Apr. 13, 2004

(54) OPTICAL LENS DEVICE ASSEMBLY

(75) Inventors: Hironori Sasaki, Yamanashi (JP);
Masahiro Uekawa, Kanagawa (JP);
Takeshi Takamori, Tokyo (JP);
Yoshinori Maeno, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 78 days.

(21) Appl. No.: 10/133,739

(22) Filed: Apr. 29, 2002

(65) Prior Publication Data

US 2002/0171945 A1 Nov. 21, 2002

(30) Foreign Application Priority Data

May 15, 2001 (JP) ........................................ 2001/144836

(51) Int. Cl.⁷ ................................................. G02B 9/04
(52) U.S. Cl. ......................................... 359/793; 385/33
(58) Field of Search ................................. 359/793–795, 359/708–710, 717, 642; 385/15, 31, 33, 35, 39

(56) References Cited

U.S. PATENT DOCUMENTS

| | | | | | |
|---|---|---|---|---|---|
| 4,496,211 A | * | 1/1985 | Daniel | ........................ | 385/31 |
| 4,729,621 A | * | 3/1988 | Edelman | ...................... | 385/33 |
| 5,559,911 A | * | 9/1996 | Forkner et al. | ................ | 385/33 |
| 5,911,021 A | | 6/1999 | MacDonald et al. | .......... | 385/35 |

OTHER PUBLICATIONS

Hongtao Han, et al., "Integration of silicon bench micro-optics", Proc. SPIE vol. 3631, Apr. 1999, pp. 234–243.

* cited by examiner

*Primary Examiner*—Jordan M. Schwartz
(74) *Attorney, Agent, or Firm*—Wenderoth, Lind & Ponack, L.L.P.

(57) ABSTRACT

An optical lens device assembly is provided which is capable of being substantially free from a deviation in an optical axis of an optical lens caused by errors of its manufacturing, thus preventing a drop in coupling efficiency and enabling easy alignment of the optical axis of the optical lens. One of end faces of two optical lens is used as a lens plane and the two optical lens are optically in series coupled. The two optical lenses are placed in a manner that their non-lens planes face each other.

18 Claims, 10 Drawing Sheets

OPTICAL LENS DEVICE ASSEMBLY

BACKGROUND OF THE INVENTION

1. Field of the Invention

The present invention relates to an optical lens device assembly comprising two optical lens devices and more particularly to an ideal optical lens device assembly being made up of microlenses.

2. Description of the Related Art

In optical communications, in order to guide signal light from, for example, a laser diode used as a light emitting element into an optical fiber, a combination of microlenses each having a diameter of a hundred and several tens $\mu$m is employed.

As shown, for example, in "Proceeding SPIE" (Vol. 3631, p234–243) issued in April 1999 which has disclosed such the microlens, a plurality of microlenses each having a columnar shape is collectively by bundling many cylindrical optical elements each having an outer diameter being equal to that of an optical fiber to be optically coupled to the microlens and performing photolithography and etching processing, by one operation, on end faces of the optical elements to collectively form specified lens planes on each of end faces of many optical elements.

Also, by forming many lens planes on an optical substrate made up of, for example, a silicon crystal at regular intervals and then coating lens portions containing each lens plane with a etching mask and by performing etching processing on the substrate region being exposed from the above mask to form many columnar microlenses portions each having a lens plane at each end on an optical substrate and then by separating each of the microlenses portions from the optical substrate, many columnar microlenses can be also formed collectively.

Such the microlens is used in a form of a lens device assembly constructed by combining a first microlens adapted to convert diverging light emitted from a light emitting element to a collimated beam with a second microlens adapted to gather the collimated beam transferred through the microlens at an end of an optical fiber. To guide the diverging light emitted from the light emitting element into the optical fiber, the lens device assembly made up of the first and second microlenses is placed between the light emitting element and the optical fiber.

The optical fiber is placed in a V-shaped groove formed, by photolithography and etching technologies, which are generally used in Si LSI manufacturing processss, relative to the light emitting element with high accuracy, on a substrate, thus enabling highly accurate alignment of an optical axis of the light emitting element and that of the optical fiber. Moreover, as described above, by serially placing two columnar microlenes each having an outer diameter being approximately equal to that of the optical fiber in the V-shaped groove, it is made possible to fitly place the two microlenses by a passive alignment method using no monitoring light and without the occurrence of a deviation in the optical axis.

However, the conventional microlens has a problem. That is, the conventional microlens made up of a columnar optical element with a lens plane on its one end generally has a shape of a truncated cone because a diameter of the optical element is easily changed along its optical axis due to errors in manufacturing the microlens. When two microlenses having the truncated cone shape are serially placed in the groove, a great deviation occurs in the optical axis depending on a form of placement of these two microlenses.

SUMMARY OF THE INVENTION

In view of the above, the present invention has an object that is to provide an optical lens device assembly which can decrease a deviation between optical axes of two optical lenses caused by manufacturing errors, thus can prevent a drop in coupling efficiency.

According to a first aspect of the present invention, there is provided an optical lens device assembly including:

two optical lens devices each having a truncated cone shape as a whole and being made up of an optical element one end face of which serves as a lens plane and another end face of which serves as a non-lens plane, and being placed on a reference plane so as to be optically coupled in series; and wherein the two optical lens devices are placed in a manner that the non-lens planes of the two optical lens devices face each other.

In this optical lens device assembly, the two optical lens devices may be placed in a manner that either smaller end faces of the two optical lens devices face each other or larger end faces of the two optical lens devices face each other.

Also, the two optical lens devices may be placed so as to be symmetric with respect to a virtual intermediate plane between the two optical lens devices.

Also, a smaller end face of one optical lens device may face a larger end face of another optical lens device.

Also, the two optical lens devices may be placed in a manner that smaller end faces of the two optical lens devices are aligned in same direction and larger end faces of the two optical lens devices are aligned in same direction.

According to a second aspect of the present invention, there is provided an optical lens device assembly including:

two optical lens devices each having a truncated cone shape as a whole and being made up of an optical element one end face of which serves as a lens plane and another end face of which serves as a non-lens plane, and being placed on a reference plane so as to be optically coupled in series; and wherein the two optical lens devices are placed in a manner that planes of outgoing light of the two optical lens devices serve as the lens plane.

In this optical lens device assembly, the two optical lens devices may be placed in a manner that either smaller end faces of the two optical lens devices face each other or larger end faces of the two optical lens devices face each other.

Also, the two optical lens devices may be placed so as to be symmetric with respect to a virtual intermediate plane between the two optical lens devices.

Also, a smaller end face of one optical lens device may face a larger end face of another optical lens device.

Also, the two optical lens devices may be placed in a manner that smaller end faces of the two optical lens devices are aligned in same direction and larger end faces of the two optical lens devices are aligned in same direction.

Moreover, in the foregoing, the two optical lens devices may be placed in a concave groove formed on a substrate providing the reference plane in which optical fiber being optically coupled to the optical lens device is placed.

Also, the two optical lens devices may be microlenses.

Also, the two optical lens devices may be microlens made of a silicon crystal substrate.

With the above configurations, by placing both the microlenses according to the specified placements described above respectively, the optical axes of the two optical microlenses can be adjusted easily. Therefore, even if each of the microlenses is changed to a truncated cone shape due to the manufacturing errors so that it can not show a cylindrical shape as a whole, the deviation between the optical axes can be decreased. As a result, it is possible to prevent easily a drop in the substantial coupling efficiency.

BRIEF DESCRIPTION OF THE DRAWINGS

The above and other objects, advantages and features of the present invention will be more apparent from the following description taken in conjunction with the accompanying drawings in which.

DESCRIPTION OF THE PREFERRED EMBODIMENTS

Best modes of carrying out the present invention will be described in further detail using various embodiments with reference to the accompanying drawings.

Embodiment

FIG. 1 is a diagram illustrating a form of placement of two microlens employed in an embodiment of the present invention. Prior to detailed descriptions of the placement of the two microlenses by referring to FIG. 1, an application example is explained to which a microlens and a microlens assembly of the present invention are used.

Figure 9:
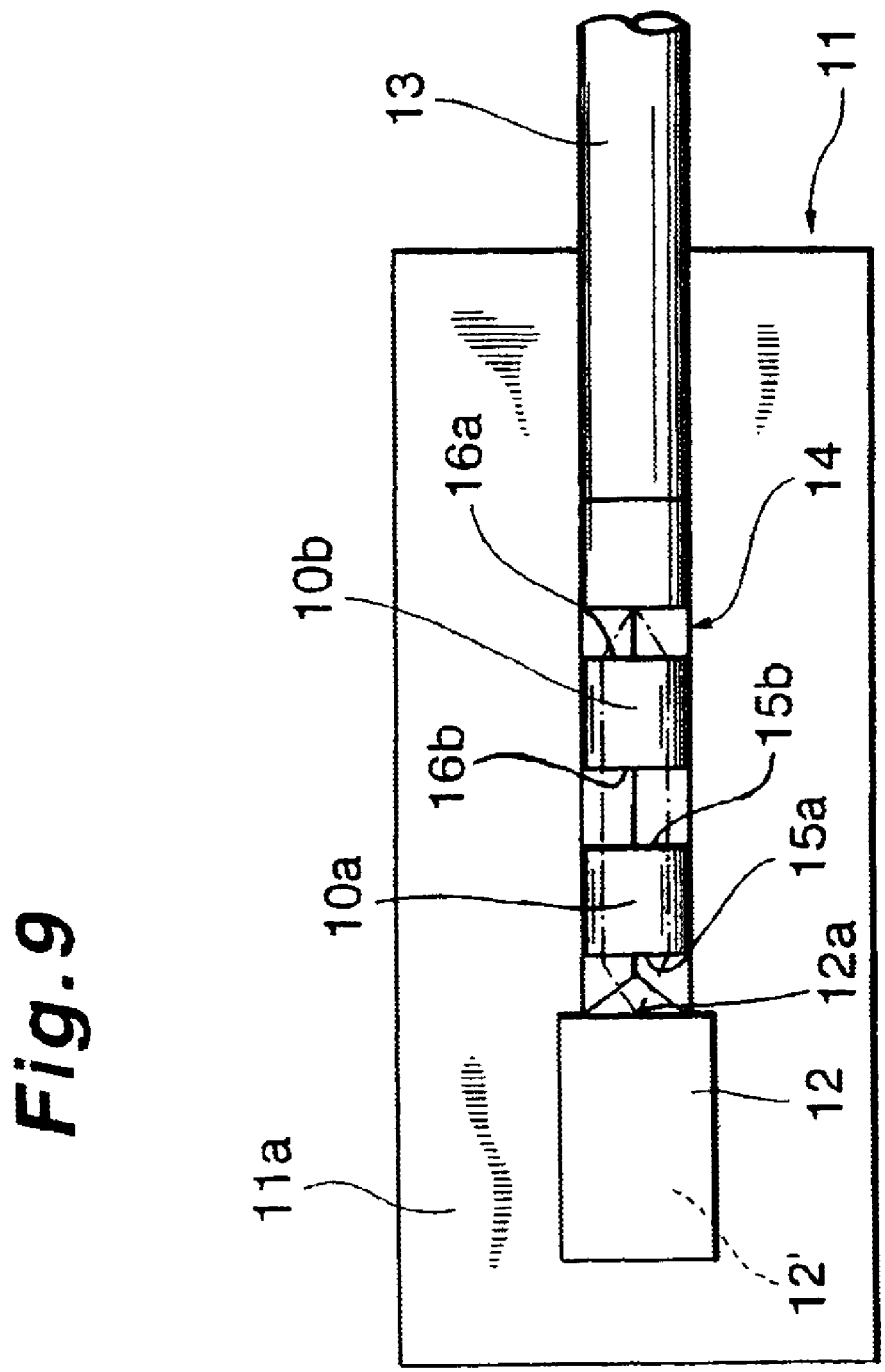
FIG. 9 is a plan view of an optical apparatus in which a microlens assembly of the present invention is used.

As shown in FIG. 9, the optical lens device assembly 10 (made up of microlenses 10a and 10b) of the present invention is used as an optical unit for optical communications. In FIG. 9, the micorlenses 10a and 10b make up the optical lens device assembly 10 which is used to guide a signal light emitted from a laser diode 12 serving as a light emitting element to an end of an optical fiber 13 placed on a crystal substrate 11 serving as a support substrate.

As the crystal substrate 11, for example, a silicon crystal substrate is employed. On the crystal substrate is formed, by an etching method, a V-shaped concave groove 14 used to perform positioning of the optical fiber 13. The optical fiber 13 is fitly supported on the crystal substrate 11 by placing a part of its portion surrounding a wall of the optical fiber 13 into the V-shaped concave groove 14. The laser diode 12 operating as the light emitting element is fixed in the vicinity of a terminating portion of the concave groove 14 on a surface 11a of the crystal substrate 11 through a well-known electrode 12' formed on the crystal substrate 11, so that an optical axis of a light emitting plane 12a of the laser diode 12 is aligned exactly with an optical axis of the optical fiber 13 positioned by the concave groove 14.

The optical fiber 13, when having received signal light having a wavelength of, for example, 1.3 $\mu$m or 1.5 $\mu$m which is emitted from the laser diode 12 at an end portion of the optical fiber 13, operates to guide the received signal light to its required portion. Moreover, the optical fiber 13 can be constructed of a single mode optical fiber having an outer diameter of, for example, 125 $\mu$m.

The optical lens device assembly 10 (made up of the microlenses 10a and 10b) is placed between the laser diode 12 and the optical fiber 13 so as to guide the signal light emitted from the light emitting plane 12a to the end portion of the optical fiber 13.

The optical lens device assembly 10 is made up of two microlenses 10a and 10b, as described above. Each of the microlens 10a and 10b is constructed of an optical element having an approximately cylindrical shape as a whole, which has an diameter being approximately equal to that of the optical fiber 13. As described above, the two microlenses 10a and 10b are arranged in the concave groove 14 in a manner that they are placed between the laser diode 12 and the optical fiber 13. As a material for each of the microlenses 10a and 10b, an optical element being suitable for a wavelength of light to be handled can be selected. For example, if light having a wavelength of 1.3 $\mu$m or 1.5 $\mu$m is handled, a low-loss material in the wavelength band of 1.3 $\mu$m or 1.5 $\mu$m such as a silica or silicon can be employed.

In FIG. 9, the microlens 10a placed in the vicinity of the laser diode 12 has a lens plane at one end face 15a of the microlens 10a facing the laser diode 12 and the lens plane has a collimating function to convert diverging light emitted from the light emitting plane 12a of the laser diode 12 to a collimated beam. An other end face 15b of the microlens 10a is a flat plane implementing no lens functions.

The microlens 10b placed in the vicinity of the optical fiber 13 has a lens plane at its one end 16a facing the optical fiber 13 and the lens plane has a light-gathering function to gather the collimated beam transferred from the microlens 10a at an end of the optical fiber 13. An other end face 16b of the microlenes 10b is a flat plane implementing no lens function. Each of the microlenses 10a and 10b can be configured so as to have not only the collimating function but also desired optical characteristics.

As each of lens planes of the mircrolenses 10a and 10b, either of a well-known diffractive optical element (in other words, diffractive type lens plane) using a diffraction phenomenon or a refractive optical lens element using a refraction phenomenon may be employed as necessary. For example, a computer-generated hologram (CGH) can be used as the diffractive optical element.

Both the microlenses 10a and 10b are arranged serially in the concave groove 14 with the flat end faces 15b and 16b both serving as non-lens planes being faced each other so that they can guide diverging light emitted from the laser diode 12 to the optical fiber 13.

So long as the outer diameter of the cylindrical optical element constituting both the microlenses 10a and 10b is equal to that of the optical fiber 13, surrounding side face portions extending between both ends of the microlenses 10a and 10b can be partially placed in the concave groove 14 in the crystal substrate 11 defining a reference plane so that an optical axis of the optical lens device assembly 10 made up of the microlenses 10a and 10b coincides exactly with a reference axis defined by the laser diode 12 and the optical fiber 13.

Figure 10:
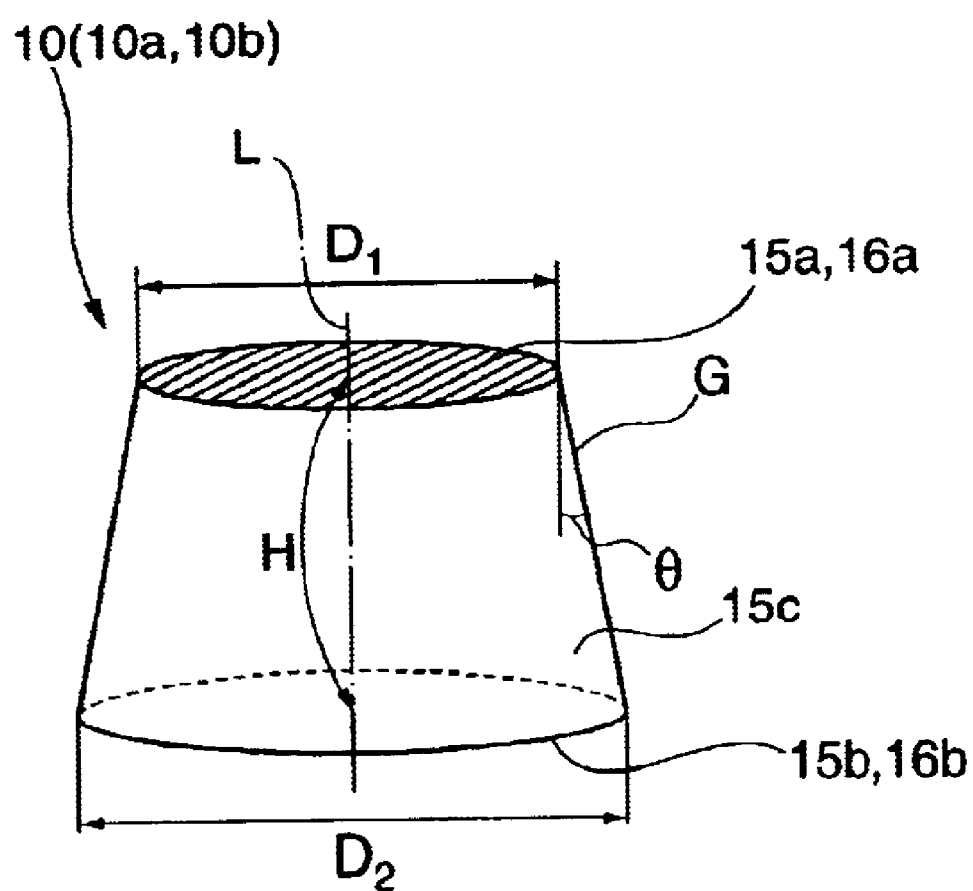
FIG. 10 is a perspective view illustrating one example of a microlens of the present invention.

However, as shown in FIG. 10 being a magnified view of each of the microlenses 10a and 10b, a diameter of the end face 15a of the microlens 10a or end face 16a of the micorlens 10b is slightly different, due to errors in manufacturing the microlenses 10a and 10b, from that of the other end face 15b of the micorlens 10a or end face 16b of the micorlens 10b both serving as non-lens planes, as a result, providing the microlenses 10a and 10b each having a truncated cone shape.

In the example as shown by FIG. 10, each of the microlenses 10a and 10b has a thickness H of, for example, 100 μm, their smaller end face 15a or 16a being a lens plane has an diameter D1 of, for example, 125 μm which is equal to the outer diameter of the optical fiber 13, and their larger end face 15b or 16b being a non-lens plane has an diameter D2 being slightly larger by, for example, 0.2 μm to 0.7 μm than the above diameter D1.

Instead of above case, the smaller end face 15a or 16a may be the non-lens plane, then the larger end face 15b and 16b may be the lens plane. In this case, the diameter of the larger end face 15b or 16b being a lens plane is 125 μm, and the diameter of the smaller end face 15a or 16a being a lens plane is slightly smaller by, for example, 0.2 μm to 0.7 μm than 125 μm.

Also, the thickness H of each of the microlenses 10a and 10b, diameters D1 of the end faces 15a and 16a, and D2 of the end faces 15b and 16b are not limited to the values shown above and various values may be used.

Moreover, it is not necessary for both the microlenses 10a and 10b to have the same dimensions and/or the same truncated cone shapes and they can be configured by the microlens 10a and 10b each having a different dimension and/or a different truncated cone shape. However, in order to simplify descriptions of them, in the following description, an example is explained in which both the microlenses 10a and 10b have the same dimensions and the same truncated cone shapes.

An angle "θ" formed by an optical axis "L" of the microlens 10a or 10b and a ridge line "G" defined by a surrounding side face portion 15c of the microlenses 10a or 10b corresponds to a deviated angle "θ" of the microlens optical axis from the reference optical axis defined by the laser diode 12 and the optical fiber 13 when each of the microlenses 10a and 10b is placed in the concave groove 14 defining a reference plane. The above angular deviation changes coupling efficiency of the optical lens device assembly 10 to be obtained when signal light emitted from the laser diode 12 has reached an end face of the optical fiber 13. To obtain a relation between the deviated angle (θ) and the coupling efficiency, an example model is studied in which the microlenses 10a and 10b are placed in a manner so as to be symmetric with respect to a virtual intermediate plane P1 between both the mirolenses 10a and 10b as shown in FIGS. 1 and 2.

When the microlenses 10a and 10b are placed in a manner so as to be symmetric with respect to the virtual intermediate plane P1, there are two forms of placement of the microlens 10a and 10b, one being a form in which the microlenses 10a and 10b are placed with their smaller end faces being faced each other and another being a form in which the microlenses 10a and 10b are placed with their larger end faces being faced each other. The relation between the deviated angle (θ) and the coupling efficiency to be obtained in each of the two form of placement was calculated using the model shown in FIG. 3.

Figure 3:
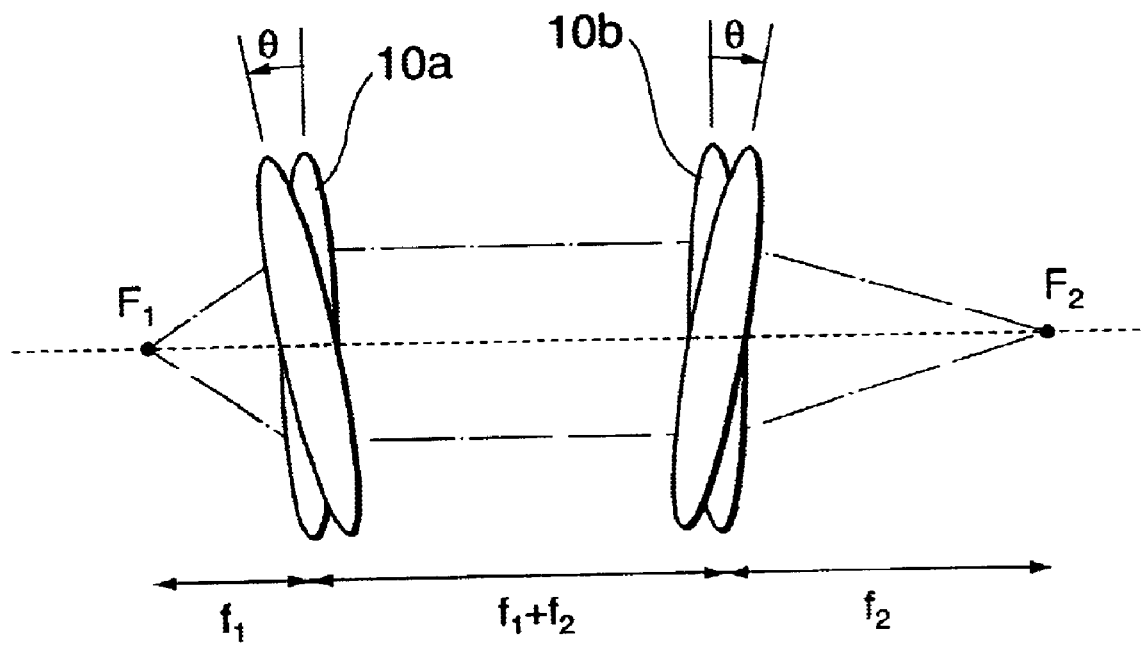
FIG. 3 is a diagram illustrating an angular difference between an optical axis of each of the microlenses of FIGS. 1 and 2 and a reference optical axis provided in the embodiment of the present invention.

In the example model shown in FIG. 3, a focal length "f1" of the first micorlens 10a is 80 μm, a focal length "f2" of the second micorlens 10b is 360 μm, a radius of a beam waist "ω" of the laser diode 12 is 1.0 μm and a radius of the beam waist "ω" of the optical fiber 13 is 4.6 μm. In this model, absolute values of the deviated angle (θ) of the microlens 10a and of the microlens 10b are the same but directions of the deviation are different from each other.

Figure 4:
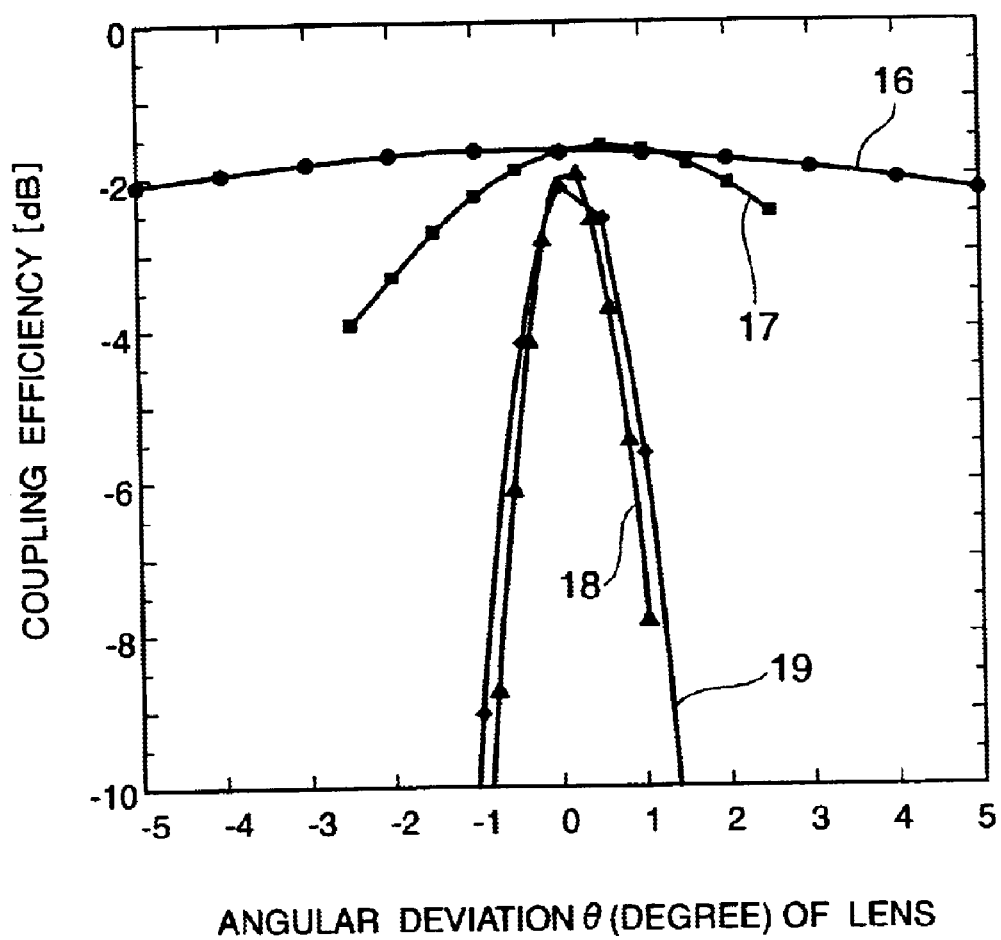
FIG. 4 is a graph showing a relation between the angular difference and lens coupling efficiency provided in the embodiment of the present invention as shown in FIG. 3.

A graph showing simulation results in each form of the placement of the microlenses 10a and 10b illustrated in FIG. 1(a) to FIG. 1(d) and FIG. 2(a) to FIG. 2(d) is provided in FIG. 4. In FIG. 4, the deviated angle (θ) (degree) is plotted as abscissa and the coupling efficiency (dB) of the optical lens device assembly 10 at each deviated angle (θ) as ordinate.

A line 16 shown in FIG. 4 represents the simulation results obtained when the microlenses 10a and 10b are placed with their smaller end faces 15a and 16a being faced each other or with their larger end faces 15b and 16b being faced each other and when the lens planes of the microlenses 10 and 10b are formed at end faces being opposite to end faces (non-lens planes) facing each other.

Figure 1A:
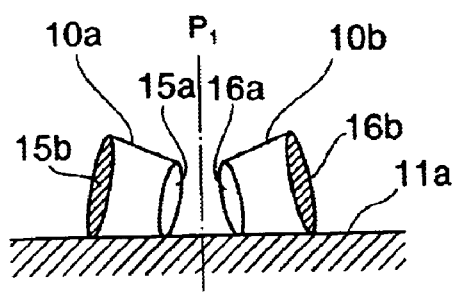
FIG. 1 is a diagram illustrating a form of placement of two microlenses employed in an embodiment of the present invention.

In the form of the placement illustrated in FIG. 1(a), the larger end face 15b of the microlens 10a placed on a side of the laser diode 12 serves as an incident plane on which a lens plane is formed. Moreover, the smaller end face 15a of the microlens 10a is used as a non-lens plane and serves as an exit plane. On the other hand, the smaller end face 16a of the microlens 10b placed on a side of the optical fiber 13 is used as a non-lens plane and serves as an incident plane. The larger end face 16b of the microlens 10b serves as an exit plane on which a lens plane is formed.

Figure 1B:
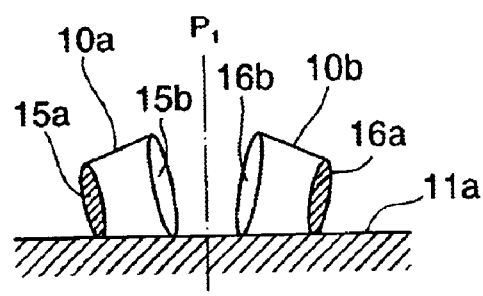

In the form of the placement shown in FIG. 1(b), the smaller end face 15a of the microlens 10a placed on the side of the laser diode 12 serves as an incident plane on which a lens plane is formed. The larger end face 15b of the microlens 10a is used as a non-lens plane and serves as an exit plane. On the other hand, the larger end face 16b of the microlens 10b placed on the side of the optical fiber 13 is used as a non-lens plane and serves as an incident plane. The smaller end face 16b of the microlens 10b serves as an exit plane on which a lens plane is formed.

As is apparent from the line 16, in the case of the first form of the placement shown in FIG. 1(a) and FIG. 1(b), so long as the deviated angle (θ) is within a range of ±5°, at any deviated angle (θ), the coupling efficiency as high as about −2 dB was obtained.

Figure 1C:
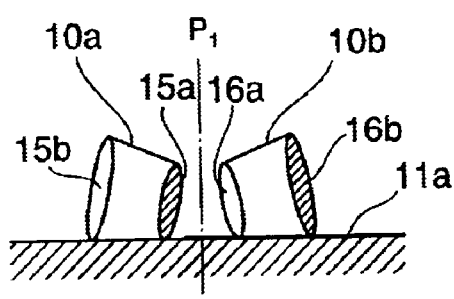

A line 17 illustrated in FIG. 4 represents simulation results obtained when the micorlenses 10a and 10b are placed so as to be symmetric with respect to the virtual intermediate plane P1 as shown in FIG. 1(c) and FIG. 1 (d) and planes of outgoing light of both the microlenses 10a and 10b are used as lens planes.

In the form of the placement shown in FIG. 1(c), the larger end face 15b of the microlens 10a placed on the side of the laser diode 12 serves as a incident plane and is used as a non-lens plane. The smaller end face 15a of the microlens 10a is used as a lens plane and serves as a exit plane. On the other hand, the smaller end face 16a of the microlens 10b is used as a non-lens plane and serves as a incident plane. The larger end face 16b of the microlens 10b serves as a exit plane on which a lens plane is formed.

Figure 1D:
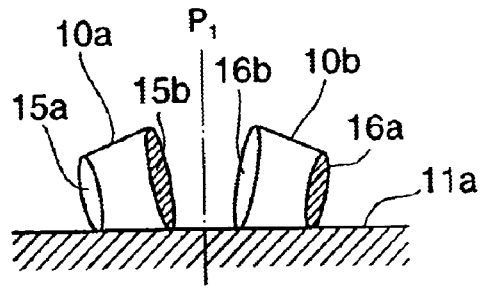

In the form of the placement shown in FIG. 1(d), the smaller end face 15a of the microlens 10a placed on the side of the laser diode 12 is used as a non-lens plane and serves as an incident plane. The larger end face 15b of the microlens 10a serves as an exit plane on which a lens plane is formed. On the other hand, the larger end face 16b of the microlens 10b placed on the side of the optical fiber 13 is used as a non-lens plane and serves as an incident plane. The smaller end face 16a of the microlens 10b serves as an exit plane on which a lens plane is formed.

As is apparent from the line 17 obtained in the case of the second form of the placement shown in FIG. 1(c) and FIG. 1(d), if the deviated angle (θ) is within a range of ±2°, the coupling efficiency of −3 dB, which does not present a problem from a practical view, can be obtained.

On the other hand, another form of placement is shown in FIG. 2(a) to FIG. 2(d) in which the micorlenses 10a and 10b are placed so as to be symmetric with respect to the virtual intermediate plane P1 and in a manner that the smaller end faces 15a and 16a face each other or the larger end faces 15b and 16b face each other and in a manner that the end faces on which lens planes are formed face each other or the end faces serving as planes of incident light are used as lens planes.

Figure 2A:
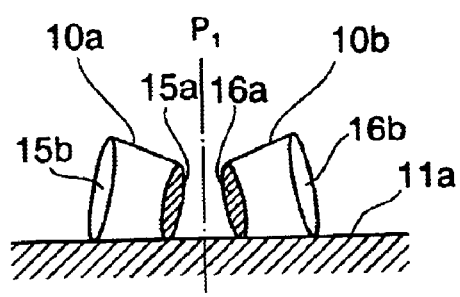
FIG. 2 is a diagram illustrating a form of placement of two microlenses not employed in the embodiment of the present invention.
Figure 2B:
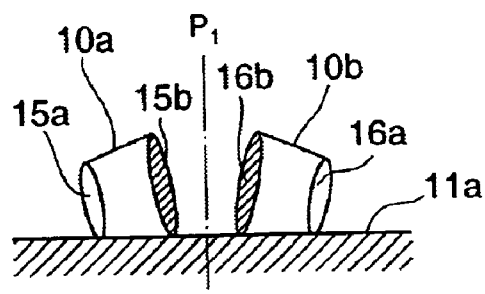
Figure 2C:
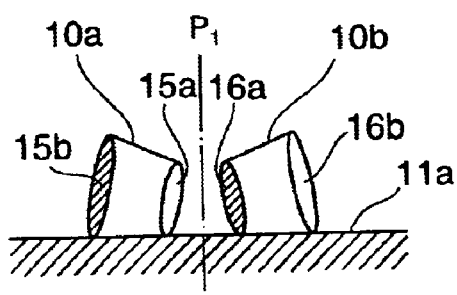
Figure 2D:
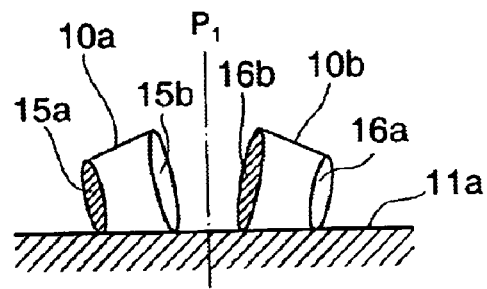

That is, in the form of the placement shown in FIG. 2(a) and FIG. 2(b), the microlenses 10a and 10b are placed with their lens planes being faced each other and, in the form of the placement shown in FIG. 2(c) and FIG. 2(d), the microlenses 10a and 10b are placed so that the end face serving as the incident plane is used as a lens plane, that is, when the smaller end face of either one of the microlenses 10a and 10b serve as lens plane, the larger end face of another microlens is used as the lens plane.

The line 18 shown in FIG. 4 represents the characteristics as obtained when the microlenses 10a and 10b are placed in the form of the placement shown in FIG. 2(a) and FIG. 2(b) and the line 19 represents the characteristics as obtained when the microlenses 10a and 10b are placed in the form of the placement shown in FIG. 2(c) and FIG. (d).

As is apparent from both lines 18 and 19, when the microlenses 10a and 10b are placed in the form of the placement shown in FIG. 2(a) to FIG. 2 (d) and when the deviated angle (θ) is within a range not exceeding ±1°, a great drop exceeding −3 dB in the coupling efficiency, which is not negligible from a practical view, occurs.

Thus, when the two microlenses 10a and 10b both having the truncated cone shapes are used in combination as the optical lens device assembly 10 and when the microlenses 10a and 10b are placed in a manner that the smaller end face 15a of the microlens 10a faces the smaller end face 16a of the microlens 10b or the larger end face 15b of the microlens 10a faces the larger face 16b of the microlens 10b, as described by referring to FIG. 1(a) to FIG. 1(d), by employing the form of the placement in which end faces of the microlenses 10a and 10b that face each other are used as the non-lens plane or planes of outgoing light of the microlenses 10a and 10b are used as lens planes, even if the angular deviation between the reference optical axis and the optical axes of the microlenses 10a and 10b occurs due to errors in manufacturing the microlenses 10a and 10b, so long as the deviated angle is within a range of ±2°, the drop in the coupling efficiency is negligible from a practical point of view and therefore it is made possible to easily perform alignment of the optical axes of both the microlenses 10a and 10b by a passive alignment method without causing the substantial drop in the coupling efficiency.

Particularly, by employing the first form of the placement of the microlenses 10a and 10b as shown in FIG. 1(a) and FIG. 1(b) in which the smaller end faces 15a and 16a or the larger end faces 15b and 16b existing on a side being opposite to end faces being faced each other are used as lens planes, even when the deviated angle (θ) exceeds ±5°, the coupling efficiency being as high as −2 dB is achieved and, as a result, even if there are errors in manufacturing the microlenses 10a and 10b, highly accurate passive alignment can be easily implemented.

In the above description, when the microlenses 10a and 10b are placed so as to be symmetric with respect to a virtual intermediate plane P1, the relation between the deviated angle (θ) and the coupling efficiency is defined based on the model as shown in FIG. 3.

Next, deviated angle (θ) between optical axes of the microlenses 10a and 10b and the reference optical axis is considered when smaller end faces of the microlenses 10a and 10b and larger end faces of the microlenses 10a and 10b are aligned in the same direction.

In the form of the placement in which smaller end faces of the microlenses 10a and 10b and larger end faces of the microlens 10a and 10b are aligned in the same direction, as shown in FIGS. 5 and 6, one lens plane formed in one end face of either one of the microlens 10a or 10b is arranged so as to be approximately parallel to the lens plane formed in the end face of another microlens.

Figure 7:
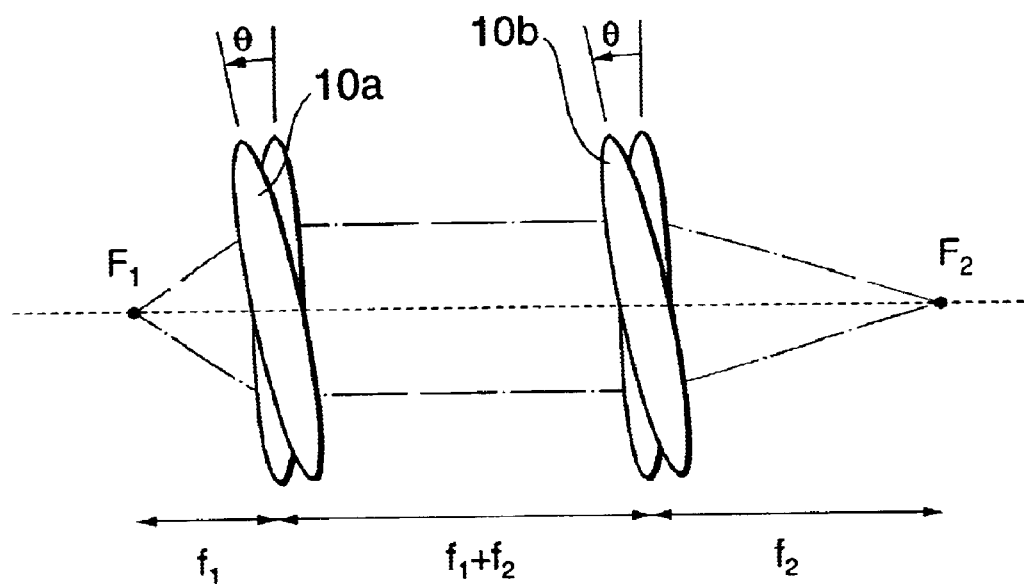
FIG. 7 is a diagram illustrating an angular difference between an optical axis of each of the microlenses of FIGS. 5 and 6 and a reference optical axis provided in the embodiment of the present invention.

In this case, as illustrated in FIG. 7, absolute values of the deviated angles (θ) of the microlenses 10a and 10b and their directions of the deviation are the same. Moreover, a focal length f1 of the microlens 10a, focal length f2 of the second microlens 10b, radius of a beam waist "ω" of the laser diode 12 and radius of the beam waist "ω" of the optical fiber 13 applied in FIG. 7 are the same as in FIG. 3.

Figure 5A:
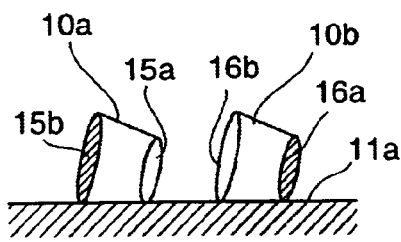
FIG. 5 a diagram illustrating another form of the placement of two microlenses employed in an embodiment of the present invention.
Figure 5B:
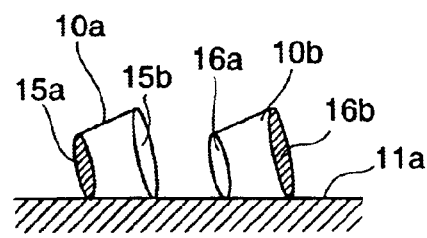
Figure 8:
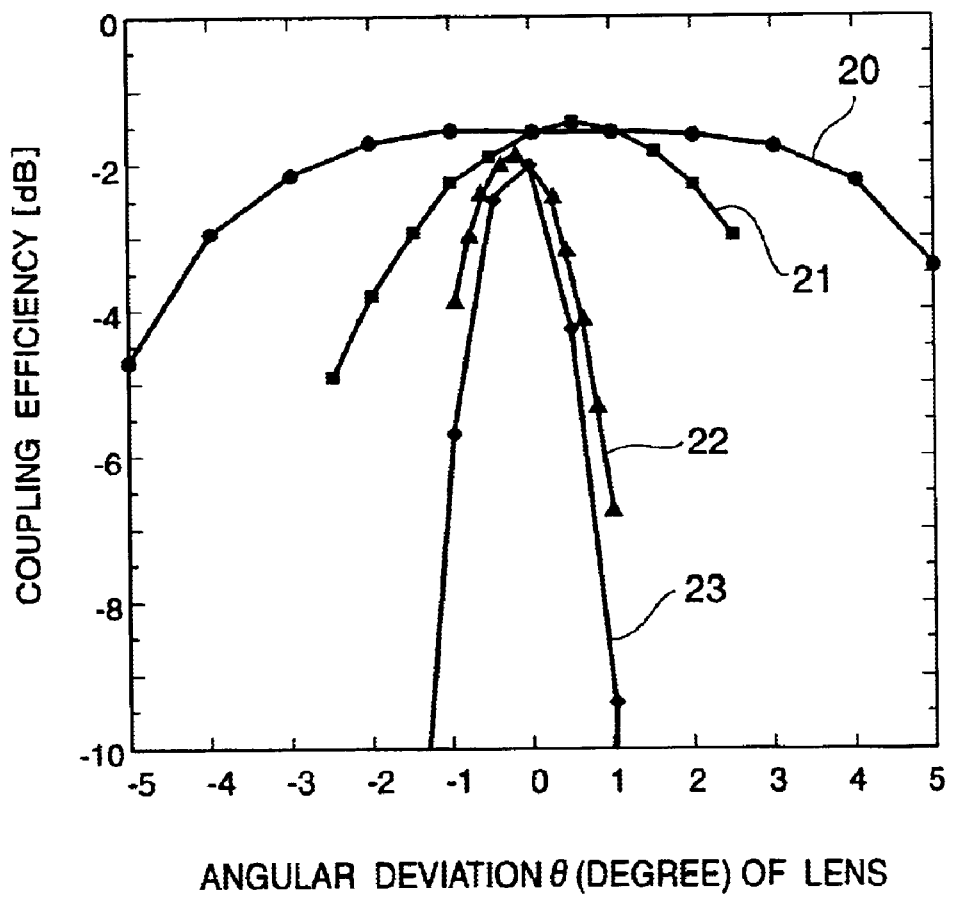
FIG. 8 is a graph showing a relation between the angular difference and lens coupling efficiency provided in the embodiment of the present invention as shown in FIG. 7.

FIG. 8 shows simulation results obtained when the microlenses 10a and 10b are arranged in the form of the placement shown in FIG. 5(a) to FIG. 5(b) and in FIG. 6(a) to FIG. 6(d). In FIG. 8, as in the case in FIG. 4, the deviated angle (θ) (degree) is plotted as abscissa and the coupling efficiency (dB) of the optical lens device assembly 10 at each deviated angle (θ) as ordinate.

A line 20 shown in FIG. 8 represents simulation results obtained when the smaller end face 15a of the microlens 10a and the smaller end face 16a of the microlens 10b are aligned in the same direction and the larger end face 15b of the microlens 10a and the larger end face 16b of the microlens 10b are also aligned in the same direction and, at the same time, non-lens planes of the microlenses 10a and 10b face each other as shown in FIGS. 5(a) and 5(b).

In the form of the placement shown in FIG. 5(a), the larger end face 15b of the microlens 10a placed on the side of the laser diode 12 serves as an incident plane on which a lens plane is formed. Moreover, the smaller end face 15a of the microlens 10a is used as a non-lens plane and serves as an exit plane. On the other hand, the larger end face 16b of the microlens 10b placed on a side of the optical fiber 13 is used as a non-lens plane and serves as an incident plane. The smaller face end 16a of the microlens 10b serves as an exit plane on which the lens plane is formed.

In the form of the placement shown in FIG. 5(b), the smaller end face 15a of the microlens 10a placed on the side of the laser diode 12 serves as an incident plane on which a lens-plane is formed. Moreover, the larger end face 15b of the microlens 10a is used as a non-lens plane and serves as an exit plane. On the other hand, the smaller end face 16a of the microlens 10b placed on the side of the optical fiber 13 is used as a non-lens plane and serves as an incident plane. Moreover, the larger end face 16b of the microlens 10b serves as an exit plane on which the lens plane is formed.

As is apparent from the line 20 in FIG. 8, in the case of the third form of the placement shown in FIG. 5(a) and FIG. 5(b), so long as the deviated angle ($\theta$) is within a range of ±4°, the coupling efficiency as high as about −3 dB was obtained at any deviated angle ($\theta$).

Figure 5C:
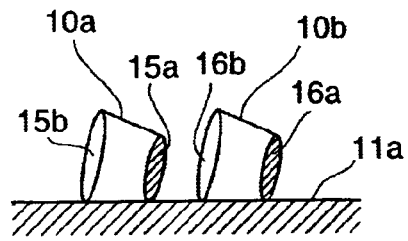

A line 21 shown in FIG. 8 represents simulation results obtained when the exit planes of the microlenses 10a and 10b are used as the lens planes in the fourth form of the placement as shown in FIGS. 5(c) and (d).

In the form of the placement shown in FIG. 5(c), the larger end face 15b of the microlens 10a placed on the side of the laser diode 12 serves as an incident plane and is used as a non-lens plane. Moreover, the smaller end face 15a of the microlens 10a is used as a lens plane and serves as an exit plane. On the other hand, the larger end face 16b of the microlens 10b placed on the side of the optical fiber 13 is used as a non-lens plane and serves as an incident plane. Moreover, the smaller end face 16a of the microlens 10b serves as an exit plane on which a lens plane is formed.

Figure 5D:
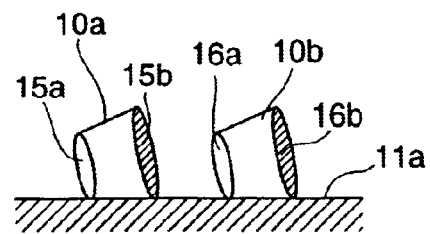

In the form of the placement shown in FIG. 5(d), the smaller end face 15a of the microlens 10a placed on the side of the laser diode 12 is used as a non-lens plane and serves as an incident plane. Moreover, the larger end face 15b of the microlens 10a serves as an exit plane on which a lens plane is formed. On the other hand, the smaller end face 16a of the microlens 10b placed on the side of the optical fiber 13 is used as a non-lens plane and serves as an incident plane. Moreover, the larger end face 16b of the microlens 10b serves as an exit plane on which a lens plane is formed.

As is apparent from the line 21 obtained in the case of the fourth form of the placement shown in FIG. 5(c) and FIG. 5(d), if the deviated angle ($\theta$) is within a range of ±2°, as in the case of the second form of the placement, the coupling efficiency of −3 dB, which does not present a problem from a practical view, can be obtained.

As stated above, mirolenses 10a and 10b are placed so that the smaller end faces 15a and 16a or the larger end faces 15b and 16b are aligned in a same direction respectively. On the other hand, other two forms are shown by FIG. 6(a) to FIG. 6(d).

Figure 6A:
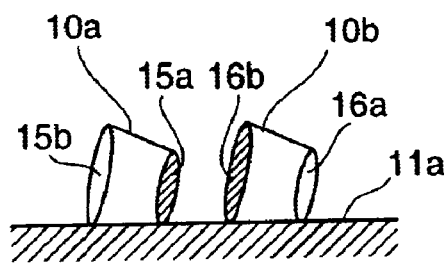
FIG. 6 a diagram illustrating another form of the placement of two microlenses not employed in the embodiment of the present invention.
Figure 6B:
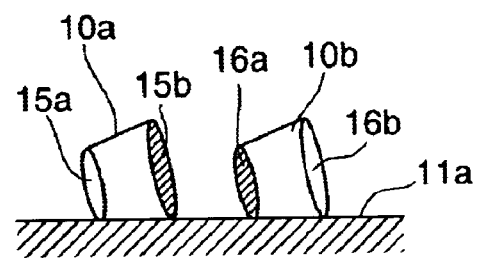
Figure 6C:
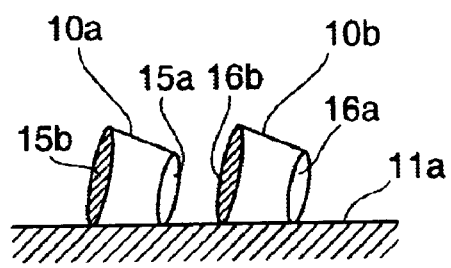
Figure 6D:
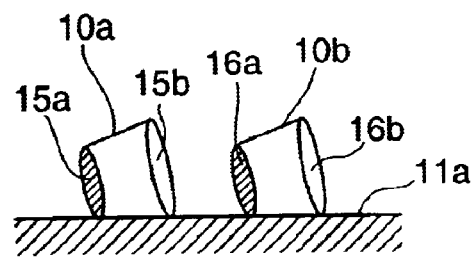

That is, in one form of the placement as shown in FIGS. 6(a) and 6(b), the lens planes of the micorlenses 10a and 10b are located face to face each other. Also in another form of the placement as shown FIGS. 6(c) and 6(d), the larger end faces 15b and 16b or the smaller end faces 15a and 16a of the microlenses 10a and 10b are lens planes and serve as incident planes.

A line 22 shown in FIG. 8 represents simulation results obtained in the case of the form of the placement shown in FIGS. 6(a) and 6(b). A line 23 shown in FIG. 8 represents simulation results obtained in the case of the form of the replacement shown in FIGS. 6(c) and 6(d).

As is apparent from both the lines 22 and 23, when the microlenses 10a and 10b are placed in the form of the placement shown in FIG. 6(a) to FIG. 6 (d) and when the deviated angle ($\theta$) is within a range not exceeding ±1°, a great drop exceeding −3 dB in the coupling efficiency, which is not negligible from a practical view, occurs.

Thus, when the two microlenses 10a and 10b both having the truncated cone shapes are used in combination as the optical lens device assembly and when the microlenses 10a and 10b are placed in a manner that their smaller end faces 15a and 16a and their larger end faces 15b and 16b are aligned in the same direction, as described by referring to FIG. 5(a) to FIG. 5(d), by employing the form of the placement in which end faces of the microlenses 10a and 10b that face each other are used as the non-lens plane or exit planes of the microlenses 10a and 10b are used as lens planes, even if the angular deviation between the reference optical axis and the optical axes of the microlenses 10a and 10b occurs due to errors in manufacturing the microlenses 10a and 10b, so long as the deviated angle is within a range of ±2°, the drop in the coupling efficiency is negligible from a practical point of view and therefore it is made possible to easily perform alignment of the optical axes of both the microlenses 10a and 10b by a passive alignment method without causing the substantial drop in the coupling efficiency.

Particularly, by employing the third form of the placement of the microlenses 10a and 10b as shown in FIG. 5(a) and FIG. 5(b) in which the end faces of the microlenses 10a and 10b that face each other are used as the non-lens plane, even when the deviated angle ($\theta$) exceeds ±4°, the coupling efficiency being as high as −3 dB can be achieved and, as a result, even if there are errors in manufacturing the microlens 10a and 10b, highly accurate passive alignment can be easily implemented.

Moreover, by employing the forms of the placement shown in FIGS. 1 (a) and 1(b) or in FIGS. 5(a) and 5(b), it is made possible to reliably prevent reflected light at the non-lens plane of the microlens 10a from being fed back to the light emitting element.

Generally, in order to prevent reflected light, for example, an antireflection coating may be used which is to be formed on both the incident plane and exit plane of the microlens 10a. The antireflection coating is effective on light entering the lens from an outside of the lens. However, it is not effective on light proceeding toward an exit plane in the lens from the incident plane of the microlens 10a and, as a result, part of the light proceeding toward the exit plane within the microlens 10a is reflected by the exit plane therein.

Therefore, if the microlens 10a is of the truncated cone shape, since a deviation of the angle ($\theta$) relative to the reference optical axis occurs in the optical axis of the microlens 10a, it is made possible to prevent the light internally reflected at the exit plane from being fed back to the laser diode 12.

Therefore, by preventing the internally reflected light from being fed back to the laser diode 12, since a factor leading to instability caused by the feed-back light in oscillation of the laser diode 12 can be removed, the first form of the placement of the microlenses 10a and 10b shown in FIGS. 1(a) and 1(b) and the third form of the placement shown in FIGS. 5(a) and 5(b) are advantageous.

It is apparent that the present invention is not limited to the above embodiments but may be changed and modified without departing from the scope and spirit of the invention.

What is claimed is:

1. An optical lens device assembly comprising:
   two optical lens devices each having a truncated cone shape as a whole and being made up of an optical element one end face of which serves as a lens plane and another end face of which serves as a non-lens plane, and being placed on a reference plane so as to be optically coupled in series; and wherein said two optical lens devices are placed in a manner that said non-lens planes of said two optical lens devices face each other.

2. The optical lens device assembly according to claim 1, wherein said two optical lens devices are placed in a manner that either smaller end faces of said two optical lens devices face each other or larger end faces of said two optical lens devices face each other.

3. The optical lens device assembly according to claim 1, wherein said two optical lens devices are placed so as to be symmetric with respect to a virtual intermediate plane between said two optical lens devices.

4. The optical lens device assembly according to claim 1, wherein a smaller end face of one optical lens device faces a larger end face of another optical lens device.

5. The optical lens device assembly according to claim 1, wherein said two optical lens devices are placed in a manner that smaller end faces of said two optical lens devices are aligned in same direction and larger end faces of said two optical lens devices are aligned in same direction.

6. The optical lens device assembly according to claim 1, wherein said two optical lens devices are microlenses.

7. The optical lens device assembly according to claims 6, wherein said microlenses are made of a silicon crystal substrate.

8. The optical lens device assembly according to claim 6, wherein the lens plane of said microlens is diffractive type.

9. The optical lens device assembly according to claim 1, wherein said two optical lens devices are placed in a groove formed on a substrate providing said reference plane in which optical fiber being optically coupled to said optical lens device is placed.

10. An optical lens device assembly comprising:

two optical lens devices each having a truncated cone shape as a whole and being made up of an optical element one end face of which serves as a lens plane and another end face of which serves as a non-lens plane, and being placed on a reference plane so as to be optically coupled in series; and wherein said two optical lens devices are placed in a manner that exit planes of said two optical lens devices serve as said lens plane.

11. The optical lens device assembly according to claim 10, wherein said two optical lens devices are placed in a manner that either smaller end faces of said two optical lens devices face each other or larger end faces of said two optical lens devices face each other.

12. The optical lens device assembly according to claim 10, wherein said two optical lens devices are placed so as to be symmetric with respect to a virtual intermediate plane between said two optical lens devices.

13. The optical lens device assembly according to claim 10, wherein a smaller end face of one optical lens device faces a larger end face of another optical lens device.

14. The optical lens device assembly according to claim 10, wherein said two optical lens devices are placed in a manner that smaller end faces of said two optical lens devices are aligned in same direction and larger end faces of said two optical lens devices are aligned in same direction.

15. The optical lens device assembly according to claim 10, wherein said two optical lens devices are microlenses.

16. The optical lens device assembly according to claim 15, wherein said microlens is made of a silicon crystal substrate.

17. The optical lens device assembly according to claim 15, wherein the lens plane of said microlens is diffractive type.

18. The optical lens device assembly according to claim 10, wherein said two optical lens devices are placed in a groove formed on a substrate providing said reference plane in which optical fiber being optically coupled to said optical lens device is placed.

* * * * *